Dec. 30, 1924.
B. NEILL
OIL SEPARATOR
Filed Oct. 5, 1923  2 Sheets-Sheet 1
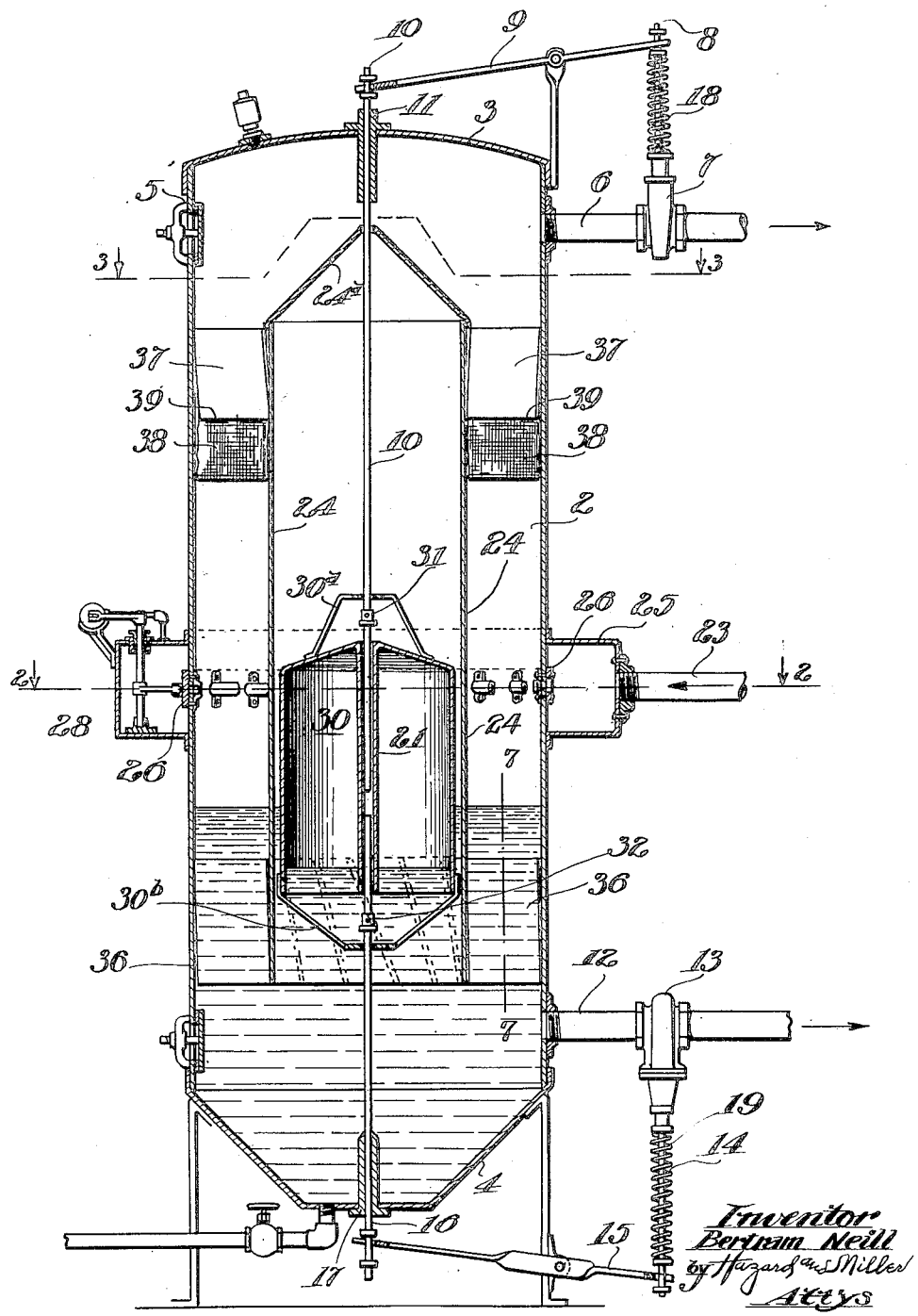

Dec. 30, 1924.
B. NEILL
OIL SEPARATOR
Filed Oct. 5, 1923
1,521,386
2 Sheets-Sheet 2
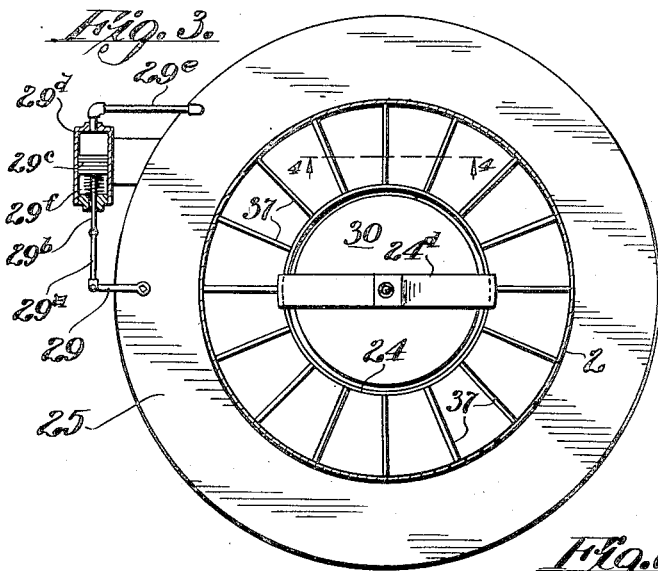
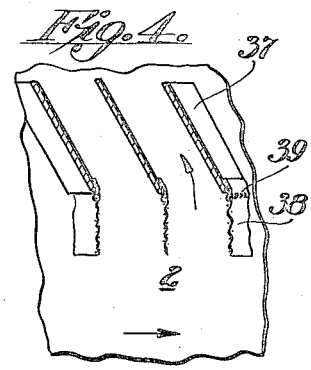
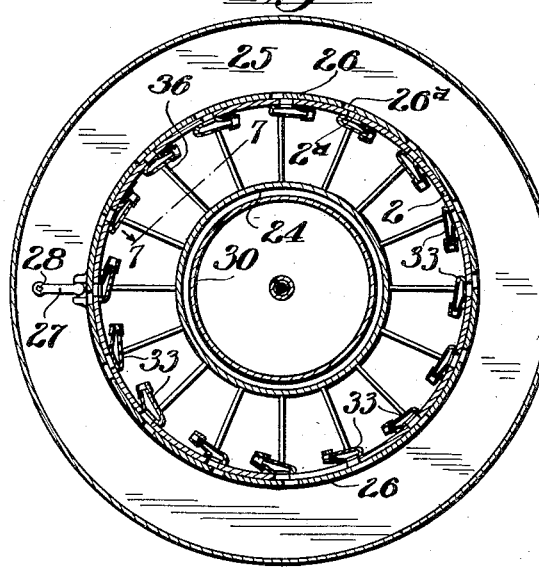
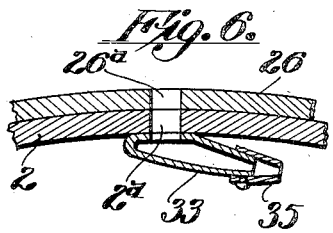
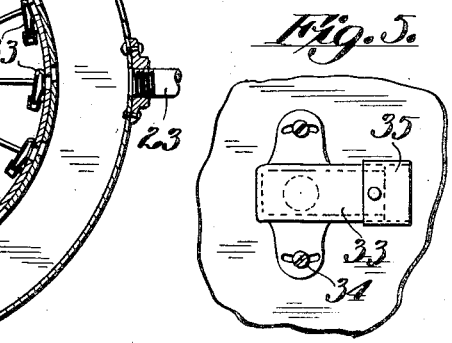
Inventor
Bertram Neill
by Hazard and Miller
Attorneys Patented Dec. 30, 1924.

1,521,386

UNITED STATES PATENT OFFICE.

BERTRAM NEILL, OF NORWALK, CALIFORNIA.

OIL SEPARATOR.

Application filed October 5, 1923. Serial No. 666,867.

*To all whom it may concern:*

Be it known that I, BERTRAM NEILL, a citizen of the United States, residing at Norwalk, in the county of Los Angeles and State of California, have invented new and useful Improvements in Oil Separators, of which the following is a specification.

This invention pertains to means for separating fluids and liquids and for separating sand and water from oil.

An object of the invention is to provide an oil separator provided with means wherein it is possible to control the well pressure so as to hold back the natural gas pressure in the well and therefore to prevent rapid expenditure or loss of the natural pressure. An advantage of this control of the natural pressure is that by holding back the pressure it will be possible to prevent the sanding up of the well which is caused by a fall of the natural gas pressure to such a degree that flow of oil is reduced or lost and the sand commonly brought in by the oil is permitted to settle down in the hole and thus choke the well. Another advantage of holding up or maintaining the natural pressure to prevent its undesirable fall is to maintain a pressure in the casing sufficient to prevent the casing from being crushed under hydrostatic pressure in the well hole.

Another object of the invention is to provide a means whereby under its own kinetic energy, the incoming gas and oil is utilized to impart a rotary movement of the gas and oil within the separator to obtain the benefits of centrifugal force and thus facilitate the separation of the sand and water as well also as the oil from the well product.

Another object is to provide a separator in which the actual separation may occur and is produced under gas line pressure and in which the natural well pressure is taken in a receiving and separate chamber from the separating chamber, so that the apparatus provides a "two-pressure" trap.

Another object is to provide means to facilitate the absorption of a portion of the gaseous products from the well into a liquid form.

Another object of the invention is to provide a separating trap in which means are operative automatically by variation in the well pressure to control the supply of well product to the separator.

Other objects and advantages will be made manifest in the following specification of an embodiment of the invention illustrated in the accompanying drawings, wherein:

Figure 1 is a vertical, central, sectional view of the separator.

Fig. 2 is a cross section on line 2—2 of Figure 1.

Fig. 3 is a cross section on line 3—3 of Figure 1.

Fig. 4 is a cross section on line 4—4 of Figure 3.

Fig. 5 is an inside elevation of a portion of the shell of the separator and showing a discharge nozzle applied thereto.

Fig. 6 is a sectional detail of one of the nozzles.

Fig. 7 is a fragmentary sectional detail on the lines 7—7 of Figs. 1 and 2 and looking in the direction indicated by the arrows.

The apparatus, as shown in its present embodiment, includes a substantial exterior shell 2 which, in the present case, is shown as cylindrical, although it may be of other form in cross section. The shell is provided with a head 3 and a bottom 4, and as may be desired at several locations, the shell is provided with hand holes 5 to provide for convenient access to the interior of the apparatus.

Leading from the upper portion of the shell is a gas outlet pipe 6 in which is provided a suitable valve 7 controlling the discharge of gas. This valve is provided with a stem 8 connected to a lever 9 which in turn is attached to a gas valve operating rod 10 passing through a bushing 11 in the head 3.

The lower portion of the shell 2 is provided with an oil outlet pipe 12 having a suitable valve 13 provided with a stem 14, and this is connected to a lever 15. The opposite end of this lever is secured to an oil valve rod 16 passing through a bushing 17 in the bottom of the shell.

Means are provided whereby the two valves 7 and 13 may be concurrently maintained in open, discharging position and means are provided for automatically restoring the valves to the open position after being separately closed. To that end, I provide spring devices here shown as coil springs 18 and 19 respectively surrounding the stems 8 and 14 of the valves 7 and 13 and operative to automatically bring their valves to open position when the parts of the apparatus are in the position shown in Figure 1.

For automatically closing either of the valves without disturbing the other, the rods 10 and 16 are arranged coaxially and their approximate ends are telescopically guided in a tube 21 which is centrally disposed in and connected to the upper end of a float 30 slidably mounted and guided within a float well casing 24 fully open at its lower end and being provided with an upwardly convergent bonnet 24$^a$ through which the stem 10 reciprocates freely.

The float 30 is provided at its upper end with a bracket 30$^a$ through which the rod 10 slides, and the float is provided at its lower end with a bracket 30$^b$ through which the rod 16 slides. Below the upper bracket 30 there is provided on the rod 10 an adjustable collar 31, and above the bracket 30$^b$ there is adjustable on the rod 16 a collar 32.

Oil well product is led to the apparatus through one or more supply connections or pipes 23 which are attached preferably immediately between the top and bottom of the shell, and I prefer that the oil product be introduced into a well pressure chamber formed by an outer box or wall 25 forming a pressure chamber surrounding the shell 2, which latter is provided, peripherally, with a series of ports 2$^a$, Figure 6, over which are adjustable a valve ring 26 for ports 26$^a$ to be registered with ports 2$^a$ of the shell, so that well product may be discharged from the well pressure chamber 25 into the shell 2 as controlled by the valve 26.

This valve 26 is preferably automatically operated according to the well pressure in the chamber 25, and to accomplish this the valve is engaged by a lever arm 27 on a rock shaft 28 which is journaled in the chamber 25 and has one end extending beyond this chamber, and carrying a lever arm 29. This lever arm is attached by a link 29$^a$ to a piston rod 29$^b$ of a piston 29$^c$ operating in a cylinder 29$^d$ which is connected by a pipe 29$^e$ to the chamber 25. Thus, pressure in the chamber 25 acts upon the piston 29$^c$ and thus rocks the shaft 28 in one direction as pressure increases; this motion opening the valve ports 2$^a$—26$^a$. As pressure falls, the spring 29$^f$ reacts on the piston to turn the valve ring 26 in the opposite direction and thus reduce the port area leading into the shell 2. From this it will be seen that I provide means automatically operative by well pressure to control the flow of well product into the shell 2.

A feature of the invention is to provide means whereby the incoming well product will be given a rotative tendency in the shell 2 and preferably with such velocity as to facilitate the separation out of the sand and water from the oil and also to aid in separating out the gas constituent from the product.

To that end, I attach nozzles 33 to the inner surface of the shell wall at the ports 2$^a$; these nozzles being so disposed as to divert the well product in a direction so as to establish a rotary or circular movement in the shell 2, the result of which is to tend to separate the ingredients according to their weights. The nozzles may be of any suitable form and construction, and are preferably adjustably mounted on supporting screws 34 so as to control the direction of discharge of the product therefrom. The nozzles are provided with renewable tips 35 by which the shape and volume of jet may be controlled, and also enabling renewal of the tips as they are worn away by the sand content in the product.

The sand, oil and water discharging from the nozzles into the shell falls promptly to the bottom of the shell and accumulates to a suitable depth, the average of which is automatically regulated by the valve means above described. To accelerate the settlement of the water and sand, a number of upwardly inclined plates or partitions 36 are arranged between the shell 2 and the lower end of the well casing 24; the plates inclining oppositely as to the direction of discharge from the nozzles 33 so as to tend to divert the circularly sweeping material downwardly toward the bottom of the shell. The centrifugal force porduced tends to throw the sand constituent outwardly toward the shell and also similarly acts on the water constituent, while the lighter oils are thus freed and accumulate around the well casing 24; the gaseous content rising freely from the liquid while this is circulating.

A feature of the invention is to aid in the absorption or recovery of portions of the gaseous content as a result of contact of these portions of the gaseous content with barriers having moistened faces, the moisture on which tends to absorb a part of the gas content. To that end, around the upper end of the well casing 24 there is disposed a series of inclined plates 37 spaced from each other and so positioned that a direct, vertical, uninterrupted flow of the gas is prevented; the plates 37 being clearly shown in Figure 4 as being arranged so that the upper end of one plate overhangs the lower end of the next contiguous plate. Further, there is attached to the lower ends of the plates 37 foraminous barriers 38, which preferably are hingedly mounted at 39 on the lower ends of the plates so that the swirling movement of the escaping gas tends to close the barriers 38 and thus retard the flow of gas, with the result that the retarded gases are caused to contact with the moistened barriers 38 and 39 and a portion of the gases condensed.

The product from the well may consist of a mixture of oil, gas, sand and water, and the heavier latter constituents collect in the bottom of the separator while the oil rises and becomes effective upon the float 30. When the oil accumulates to a predetermined high point, as regulated by the lower adjustable collar 32 on the rod 16, the float strap 30ᵇ will then engage this collar and therefore lifts the rod 16 and opens the valve 13, if it should be partially closed, so as to permit the outflow of oil through the pipe 12. Should the oil level fall below a desired degree, the float strap 30ᵃ descends and engages the adjustable collar 31 on the rod 10, with the result that the valve 7 is fully opened to permit the ready escape of gas and the accumulation of oil. Should the oil fall below a predetermined level, the tube 21 of the float 30 descends and engages the collar 32, which thus operates the lever 15 to positively close the valve 13 and cut off the outflow of oil and thus prevent gas from passing into the oil line.

In a similar manner, if the oil rises to an undesired extent, the collar 31 is engaged by the head of the float 30 and the gas valve 7 is fully closed to prevent oil from passing to the gas line. There is a suitable amount of clearance between the rods 11 and 16 so that these may be operated independently of each other.

Further embodiments, modifications and variations may be resorted to within the principle of the invention.

What is claimed is:

1. An apparatus for separating well product, comprising, in combination, a separating chamber connected to a gas line and a chamber connected to the oil line from the well to receive the well product, valvular means controlling the flow from the well pressure chamber to the separating chamber, and automatic means for actuating the valve to regulate flow of well product from the well pressure chamber to the separating chamber.

2. An apparatus for separating well product, comprising, in combination, a separating chamber connected to a gas line and a chamber connected to the oil line from the well to receive the well product, valvular means controlling the flow from the well pressure chamber to the separating chamber, and automatic means for actuating the valve to regulate flow of well product from the well pressure chamber to the separating chamber, said automatic means being operative by variations of well product pressure.

3. An apparatus for separating well product, comprising, in combination, a separating chamber connected to a gas line and a chamber connected to the oil line from the well to receive the well product, and valvular means controlling the flow from the well pressure chamber to the separating chamber, said valvular means being automatically operative by well pressure.

4. An apparatus for separating well product, comprising, in combination, a separating chamber and a surrounding well pressure chamber, and means whereby the well product flowing from the well pressure chamber to the separating chamber is so discharged into the separating chamber as to produce a rotative movement of the well product in the separating chamber to cause a tendency of centrifugal action in the well product.

5. An apparatus for separating well product, comprising, in combination, a separating chamber and a surrounding well pressure chamber, and means whereby the well product flowing from the well pressure chamber to the separating chamber is so discharged into the separating chamber as to produce a rotative movement of the well product in the separating chamber to cause a tendency of centrifugal action in the well product, said means including nozzle devices discharging the well product into the separating chamber in lines transverse to radii of the chamber.

6. An apparatus for separating well product, comprising, in combination, a separating chamber and a surrounding well pressure chamber, and means whereby the well product flowing from the well pressure chamber to the separating chamber is so discharged into the separating chamber as to produce a rotative movement of the well product in the separating chamber to cause a tendency of centrifugal action in the well product, said means including nozzle devices discharging the well product into the separating chamber in lines transverse to radii of the chamber, all of the jets from the nozzles being symmetrically discharged.

7. An apparatus for separating well product, comprising, in combination, a separating chamber, means for discharging well product into the separating chamber so as to cause the product in the chamber to take a rotative motion, and deflecting barrier means disposed in the chamber below the normal level of the liquid portion of the product, said barrier means including plates obliquely disposed so as to facilitate the throwing down of constituents of the liquid, the plates being arranged in an annular series over which the liquid portion of the well product swirls.

8. An apparatus for separating well product, comprising, in combination, a separating chamber, means for discharging well product into the separating chamber so as to cause the product in the chamber to take a rotative motion, and deflecting barrier means disposed in the chamber so as to intercept the ascending gas constituent of the product to facilitate deposit of a portion of the gases by absorption said deflecting barrier means including solid plates and foraminous barriers hingedly depending from the solid plates.

9. An apparatus for separating well product, comprising, in combination, a separating chamber, means for discharging well product into the separating chamber so as to cause the product in the chamber to take a rotative motion, and deflecting barrier means disposed in the chamber so as to intercept the ascending gas constituent of the product to facilitate deposit of a portion of the gases by absorption, said means including a series of inclined, spaced solid plates and foraminous plates hingedly depending from the solid plates.

10. An apparatus for separating well product, comprising, in combination, a separating chamber, means for discharging well product into the separating chamber so as to cause the product in the chamber to take a rotative motion, and deflecting barrier means disposed in the chamber so as to intercept the ascending gas constituent of the product to facilitate deposit of a portion of the gases by absorption, said means including a series of inclined, spaced plates, the plates being arranged in an annular series and disposed so that the upper portion of each plate vertically overhangs the lower portion of a contiguous plate and said means including foraminous plates hingedly depending from the spaced plates.

11. An apparatus for separating well product, comprising, in combination, a separating chamber, means for discharging well product into the separating chamber so as to cause the product in the chamber to take a rotative motion, and deflecting barrier means disposed in the chamber below the normal level of the liquid portion of the product, said means including a series of inclined, spaced plates, and foraminous barrier means disposed in the path of the ascending gaseous constituent of the well product.

12. An apparatus for separating well product, comprising, in combination, a separating chamber, means for discharging well product into the separating chamber so as to cause the product in the chamber to take a rotative motion, and deflecting barrier means disposed in the chamber below the normal level of the liquid portion of the product, said means including a series of inclined, spaced plates, and foraminous barrier means disposed in the path of the ascending gaseous constituent of the well product, said foraminous means including members movably supported so as to be moved in a closing direction as to the said plates.

In testimony whereof, I have signed my name to this specification.

BERTRAM NEILL.